(12) United States Patent
Mueller

(10) Patent No.: US 7,009,855 B2
(45) Date of Patent: Mar. 7, 2006

(54) SYNCHRONOUS RECTIFIER CIRCUIT

(75) Inventor: Helmut Mueller, Augsburg (DE)

(73) Assignee: Minebea Co., Ltd, Nagano-ken (JP)

( * ) Notice: Subject to any disclaimer, the term of this patent is extended or adjusted under 35 U.S.C. 154(b) by 35 days.

(21) Appl. No.: 10/486,542

(22) PCT Filed: Oct. 26, 2001

(86) PCT No.: PCT/EP02/11641

§ 371 (c)(1),
(2), (4) Date: Sep. 3, 2004

(87) PCT Pub. No.: WO03/038976

PCT Pub. Date: May 8, 2003

(65) Prior Publication Data
US 2005/0002209 A1    Jan. 6, 2005

(30) Foreign Application Priority Data
Oct. 26, 2001 (DE) ............................... 101 52 901
Jul. 17, 2002  (DE) ............................... 102 32 424

(51) Int. Cl.
H02M 3/335    (2006.01)
(52) U.S. Cl. ............................. 363/24; 363/26; 363/98
(58) Field of Classification Search .................. 363/24, 363/17, 25, 26, 98
See application file for complete search history.

(56) References Cited

U.S. PATENT DOCUMENTS 3,735,235 A * 5/1973 Hamilton et al. ............. 363/26

(Continued)

FOREIGN PATENT DOCUMENTS

DE    410 35 42    * 8/1992

(Continued)

OTHER PUBLICATIONS

Jamerson, C., et al., "Tecchniques for Reduction of Required Headroom in High- Frequency Magamp Postregulators," IEEE Transactions on Power Electronics vol. 8, No. 1, Jan. 1993, pp. 90-94.*

(Continued)

Primary Examiner—Bao Q. Vu
(74) Attorney, Agent, or Firm—Duane Morris LLP

(57) ABSTRACT

A synchronous rectifier circuit, comprising a power transformer which has a primary side, including first and second primary winding sections, and a secondary side, including first and second secondary winding sections, a rectifier circuit at the secondary side of the power transformer, which rectifier circuit comprises first and second MOSFETs associated with the first and second secondary winding sections, respectively, first and second current transforming means associated with the first and second secondary winding sections, respectively, and first and second drive circuits for the first and second MOSFETs, respectively, each current transforming means generating first and second currents which are dependent on the current of the associated secondary winding section of the power transformer, and each drive circuit comprising first and second branches to receive the first and second currents, respectively, generated by the current transforming means, and the first branch comprising a diode and a transconductance choke, and the second branch comprising a diode.

24 Claims, 7 Drawing Sheets

U.S. PATENT DOCUMENTS

| | | | |
|---|---|---|---|
| 6,314,006 B1 * | 11/2001 | Berberich et al. | 363/25 |
| 6,330,169 B1 * | 12/2001 | Mullett et al. | 363/16 |
| 6,618,274 B1 * | 9/2003 | Boylan et al. | 363/17 |
| 6,671,193 B1 * | 12/2003 | Pelkonen | 363/53 |
| 6,888,728 B1 * | 5/2005 | Takagi et al. | 363/17 |

FOREIGN PATENT DOCUMENTS

| | | | |
|---|---|---|---|
| DE | 195 16 861 | * | 11/1996 |
| DE | 197 04 604 | * | 8/1998 |

OTHER PUBLICATIONS

Billings, K., Switch Mode Power Supply Handbook, 2nd ed, McGraw-Hill, New York, 1999.*

Kubota, Y., et al., "Synchronous Rectification Circuit Using a Current Transformer," NTELC Conference Proceedings, Sep. 2000, pp. 267-273.*

International Search Report for PCT/EPO2/11641.*

* cited by examiner

SYNCHRONOUS RECTIFIER CIRCUIT

This application claims priority to the filing date of German Patent Application Nos. 101 52 901.5 filed Oct. 26, 2001, and 102 32424.7 filed Jul. 17, 2002, and PCT Application No. PCT/EP02/11641 filed Oct. 17, 2002; the specification of all of these applications are incorporated herein in their entirety.

FIELD OF THE INVENTION

The invention relates to a sychronous rectifier circuit for use in a push-pull d.c. voltage converter.

BACKGROUND OF THE INVENTION

It is the task of d.c. voltage converters to transform a direct voltage applied at their input into a direct voltage which is output at a different value, and to do so most efficiently. The output value may be greater or smaller than the input value and may be adjustable. In a d.c. voltage converter the direct voltage input, first, is transformed with the help of switching stages into alternating voltage having a rectangular waveshape. During the switch-on period "chopped" direct voltage is stored in the form of magnetic energy in a choke. During the switch-off period, it acts as a self-induction voltage at the output of the d.c. voltage converter. D.C. voltage converters operating according to this principle are referred to as choke converters. They have their inputs and outputs galvanically separated. It is known in the art to use transformers to achieve separation of potential. Here, the induced voltage occurs at the secondary winding, and the voltage transformation can be determined by the number of windings. FIG. 1 is a block diagram illustrating a transformer-type converter used as d.c. voltage converter. FIG. 1 depicts the basic elements of a transformer-type converter, including an input switching stage 10, a power transformer 12, a rectifier circuit 14, and an output filter 16. A distinction is made in the art between single phase d.c. converters and push-pull voltage transformers. A single phase d.c. converter may be regarded as being a simple electronically controlled switch, whereas switch-over operations occur with push-pull voltage transformers, and a transformer 12 having two primary windings may be required. Push-pull transformers can be derived from two single phase d.c. converters connected in parallel. The electronic switch-over is accomplished by two switching stages, and current always flows through one of the two primary windings. The invention relates to the field of push-pull voltage transformers.

In practice, such push-pull voltage transformers are employed in switch mode power supply, such as server architecture for telecommunications applications, in PCs, industrial applications, and many other situations. The invention is especially advantageous in distributed energy supply systems where several stages are connected in succession. In new server architectures, for instance, power supply units are used in which the mains voltage, to begin with, is converted into a bus voltage of some 48 to 50 V. A second conversion to +12 V, for example, then takes place within the server sub-system. The specific voltages required for the various components, such as the microprocessor, RAMs, etc. are produced locally by so-called voltage regulator modules which are connected to the 12 V rail.

Each of the converting stages must operate as efficiently as possible in view of the series connection of different power stages. For maximum efficiency to be obtained with switch mode power supply, optimization in terms of energy loss is required regarding each and every source thereof. Energy losses depend not only on the type of converter or transformer chosen, be it a single phase d.c. converter or a push-pull voltage transformer, but are determined decisively by the mode of operation of the rectifier circuit.

Making good use of the inductivities as well as driving the transducer in positive and negative directions present great advantages of push-pull voltage transformers. Another advantage is the great efficiency of the transformer and the high output power attained.

FIG. 2 is a schematic circuit diagram of a push-pull voltage transformer provided with Schottky diodes for rectification at the secondary side. The push-pull forward converter illustrated in FIG. 2 is known; its function is described, for example, in Billings, Keith "Switch Mode Power Supply Handbook", 2nd edition, McGraw-Hill, New York, 1999. This converter comprises a power transformer 18 having a primary side 18a and a secondary side 18b. The primary side 18a and the secondary side 18b each comprise two winding sections. For driving purposes, two power transistors 20, 22 are associated with the two winding sections at the primary side 18a. Two secondary diodes 24 and 26 are associated, respectively, with the two winding sections at the secondary side 18b. These diodes are connected to an output filter stage made up of a storage choke 28 and a storage capacitor 30, as may be seen in FIG. 2. The power transistors 20, 22 are driven, for instance, by a control, IC (not shown).

As the transistor 22 is driven, current will flow through the associated winding section of the power transformer 18 and also through the transistor 22. The polarity of the associated winding section at the secondary side 18b of the power transistor 18 causes the diode 26 to cut off. At the same time, voltage is induced also in the other winding section at the secondary side 18b, thus causing current to flow through the diode 24 via the storage choke 28. When a sufficient amount of energy has been transmitted from the primary side to the secondary side, the transistor 22 blocks. During the next cycle the transistor 20 is driven. The current now flowing through the second winding section of the primary side 18a causes reversal of the polarity of the associated winding at the secondary side 18b. Diode 24 blocks, while diode 26 is conducting, thus permitting current to flow through the choke 28, as during the first cycle. To make sure that the two power transistors 20, 22 will not be conducting at the same time, a compulsory break, the so-called freewheeling phase, is provided between the first and second cycles described above. During this freewheeling phase, the electric circuit at the secondary side 18b of the transformer 18 is formed of the storage choke 28, the storage capacitor 30, the two conducting diodes 24 and 26, and the connected load (not shown in the drawing).

FIG. 3 presents idealized waveshapes of the output voltages $u_{o1}$, $U_{o2}$ at the two winding sections of the secondary side 18b of the power transformer 18, forward currents $i_{o1}$, $i_{o2}$ through the diodes 24 and 26, and the output current $i_o$ through the storage choke 28.

A positive voltage $u_{o1}$ is generated during the first time interval from $t_1$ to $t_2$. Diode 24 is conducting. The overall output current $i_o$ is passed through the same and through the upper secondary winding section of the power transformer 18 toward the output. The rise in output current is determined by the voltage difference $u_{o1}-u_{o2}$ (output voltage) and the sum of the inductivities of the secondary circuit.

The second time interval from $t_2$ to $t_3$ corresponds to the so-called freewheeling phase. The output voltages $u_{o1}$ and $u_{02}$ of the transformer 18 are zero. The current $i_0$ is determined by the inductivities of the secondary circuit. If the upper and lower winding sections at the secondary side 18b are identical the output current $i_0$ is divided in two. Each of the diodes 24, 26 will carry one half of the output current $i_0$. During this time interval the output current drops.

During the third time interval from $t_3$ to $t_4$ a positive voltage $u_{02}$ is produced and diode 26 is conducting. The resulting behavior corresponds to that of the first time interval.

During the last time interval from $t_4$ to $t_5$ of period T both power transistors 20, 22 are turned off. The voltages $u_{01}$ and $u_{02}$ once again are zero, which corresponds to the freewheeling phase.

In the embodiment of the d.c. voltage converter shown in FIG. 2 the secondary rectifier is embodied by diodes. The rectifier diodes produce losses which depend on the forward voltage of the diodes 24, 26 and are composed of forward losses and switching losses of the diodes.

The forward loss $P_{DC}$ of a diode is given by the product of its forward voltage drop $u_F$ and its forward current $i_D$ (see also FIG. 4)

$$P_{DC} = u_F \cdot i_D.$$

The forward voltage rises as the load increases; it lies between 0.5 V and 1.5 V, depending on the type of diode provided. If the transducer output voltage is 3.3 V, for example, which would correspond to a processor voltage, as much as 30% of the voltage will drop at the rectifier diodes. With higher transducer output voltages, e.g. 48 V in telecommunications applications, the voltage drop at the diodes is comparatively less, but still not negligible.

The switching loss of a diode can be estimated by the following equation:

$$P_{DS} = Q_F \cdot \hat{u} \cdot f$$

where $Q_F$ is the recovered load during the fall time of the reverse current of the diode, f is the reciprocal value of period T, and-is the peak value of the diode turnover voltage.

A reduction of the forward loss discussed above can be achieved only by reducing the voltage drop.

One solution resides in the use of a MOSFET connected in parallel with the diode. That is shown in FIG. 4. The MOSFET is turned on when current in forward direction is applied to the diode, and it is turned off when the current is reversed. This is called synchronous rectification. The diode, such as diodes 24, 26, in a circuit may be replaced by a MOSFET. If the MOSFET used is of vertical structure its antiparallel diode or inverse diode (body diode) is utilized. This is illustrated in FIG. 5 which shows like members identified by like reference numerals as in FIG. 1. FIG. 5 diagrammatically illustrates the replacement of the diode-type rectifier 14 by a synchronous rectifier circuit 32 on the basis of MOSFETs.

With reference to FIGS. 4 and 5 it becomes clear that the voltage drop $u_{DS}$ at the MOSFET is determined by the switch-on resistance $R_{DS(ON)}$ of the MOSFET and the actual drain current which must equal the diode current $i_D$. The following must apply if the energy loss is to be reduced:

$$|u_{DS}| = |R_{DS(ON)} \cdot i_D| > u_F.$$

The forward loss, therefore, can be reduced by selecting a MOSFET of which the forward resistance $R_{DS(ON)}$ is small.

A control signal is required for the MOSFET to be switched on and off. Generating the control signal has a decisive influence on the switching behavior. Moreover, the energy losses in this circuit must be taken into consideration. There are various known methods of driving synchronous rectifiers comprising a MOSFET, and they may be roughly classified as self-controlled, IC controlled, and current controlled.

FIG. 6 is a simplified diagram of the secondary side of a self-controlled synchronous rectifier circuit. Again the same reference numerals are used to designate members corresponding to those of FIG. 2. The power diodes 24, 26 shown in FIG. 2 are replaced by MOSFETs 34 and 36, respectively. The first winding section at the secondary side 18b is designated $L_{S1}$, and the second winding section is designated $L_{S2}$.

In the case of the self-controlled synchronous rectifier according to FIG. 5 the output voltage of the power transformer 18 is used to control the MOSFETs 34, 36. This circuit has the advantage of necessitating only little expenditure in circuitry since no additional driver circuits are needed to drive the MOSFETs 34, 36.

With reference to FIG. 3, the output voltage $u_{01}$ at the first winding section $L_{S1}$ is positive during the time interval from $t_1$ to $t_2$, while $u_{02}$ is negative at the second winding section $L_{S2}$. With these conditions, the p-channel MOSFET 34 is switched on because its gate voltage is negative. Corresponding switching behavior is true of the p-channel MOSFET 36 during the time interval from $t_3$ to $t_4$; MOSFET 34 is turned off, while MOSFET 36 is turned on. Operation of the MOSFET switches 34, 36 during these two time intervals is satisfactory. During the freewheeling phase, however, no control voltage is generated. The current flows through the inverse diodes of the MOSFETs, whereby higher forward losses are produced than necessary.

Furthermore, it is disadvantageous with the self-controlled synchronous rectifier design that p-channel MOSFETs are needed which are much more expensive and have a higher forward resistance than comparable n-channel MOSFETs. Moreover, the transformer output voltage range is restricted due to the gate voltage of the MOSFETs 34, 36. It must be higher than the threshold voltage and lower than the maximum permissible gate voltage of the MOSFETs of approximately 30 V.

FIG. 7 is a circuit diagram of the secondary side of a synchronous rectifier with IC drive, corresponding members being designated by the same reference numerals as in FIG. 6. With this synchronous rectifier design, driver ICs 38, 40 are provided to drive the MOSFETs 34, 36. There are only a few manufacturers who offer such specific driver ICs for synchronous rectifiers. The IC components 38, 40 scan the secondary voltages of the transformer 18, and the MOSFETs 34, 36 are turned on or off, depending on the potential profile. The electronic control assures synchronous switching on and off of the synchronous rectifier. However, the scarce commercial availability and the relatively high costs and greater expenditure involved in connecting and feeding the driver ICs 38, 40 are points against making use of driver ICs 38, 40.

FIG. 8, finally, is a circuit diagram of the secondary side of a current controlled synchronous rectifier, showing only the upper part of the secondary side 18b which includes the first secondary winding section $L_{S1}$. The structure of the lower part, including the second secondary winding section $L_{S2}$ is mirror inverted.

In the current controlled synchronous rectifier, the power MOSFET 34 (and 36, too, not shown in FIG. 8) is controlled through a current transformer 42. The current transformer 42 is connected in series between the upper winding section $L_{S1}$, at the secondary side 18*b* of the power transformer 18 and the MOSFET 34 and comprises a primary winding 42*a* and a secondary winding 42*b*. The secondary winding 42*b* is connected to the gate of the MOSFET 34 by way of a voltage divider composed of two resistors 44, 46.

When the transformer 18 is controlled such that current flows through the winding section $L_{S1}$, of the secondary side 18*b* current also will flow through the inverse side of the MOSFET 34, the current transformer 42 thus generating current in its secondary winding 42*b*. This current brings about a voltage drop across the resistor 46 of a magnitude equal to the gate voltage of the MOSFET 34. The value of the voltage drop is adjustable by the ratio between the two resistors 44, 46.

MOSFET 34 is turned on during the time interval from $t_1$, to $t_2$, i.e. it is on also during the freewheeling phase. When current flows in the opposite direction the output voltage at the secondary side 42 of the current transformer 42 becomes negative and MOSFET 34 turns off. The second section $L_{S2}$ of the power transformer 18 and the second MOSFET 36 (not shown in FIG. 8) behave accordingly, yet with opposite sign.

Controlling synchronous rectifiers by means of current transformers, such as illustrated in FIG. 8, has certain disadvantages. On the one hand, a MOSFET requires a great current pulse to be turned on, which means that the windings ratio n2/n1 of the current transformer must be low. In the switched-on state, on the other hand, the gate current of the MOSFET is negligible, which means that a high windings ratio n2/n1 of the current transformer is required.

A description of prior art similar to what has been described above, but relating to a single phase forward transformer with synchronous rectification, including a current transformer, is to be found in "Synchronous Rectification Circuit Using A Current Transformer" by Y. Kubota et al., NTELC Conference Proceedings, September 2000, pages 267 to 273.

It is an object of the invention, starting from the state of the art as described above, to indicate a synchronous rectifier circuit for a push-pull voltage transformer that attains the fastest possible switching of the metal oxide semiconductor field effect transistors (MOSFETs) while, at the same time, causing the least possible power dissipation. This aim is to be reached, above all, by generating a higher switch-on current for the MOSFETs so as to keep the time of flow through the inverse diodes as short as possible, and of keeping the drive current as small as possible when the MOSFETs are in the on-state so as to minimize power dissipation.

SUMMARY OF THE INVENTION

The object is met by a synchronous rectifier circuit comprising the features recited in claim 1.

In a synchronous rectifier circuit comprising a current converter of the kind described above, the invention more specifically provides for designing the transformer of the current converter such as to include first and second secondary windings to drive the MOSFET in two stages. The first secondary winding yields a relatively high current gain, while the second secondary winding yields a relatively low current gain. Therefore, the first secondary winding can be utilized for quickly turning on the MOSFET, the gate capacitance of the MOSFET being charged rapidly by the relatively great switch-on current. In the second stage, the MOSFET which has been turned on is kept in the on state with relatively low current gain, and that requires a smaller current. Thus the MOSFET is susceptible of being driven quickly and, when turned on, being kept with low loss in its switched state.

In the preferred embodiment of the invention, therefore, the electronic switches of the synchronous rectifier circuit are embodied by MOSFETs and the invention will be discussed below in the context of that type of transistors. However, the electronic switches likewise may be implemented as bipolar transistors or any other suitable type of switch.

In addition, the invention provides for a transconductance choke to reset the secondary side 42*b* of the current transformer 42, the choke supporting the resetting or demagnetizing of the current transformer 42 after the switching operation.

While transconductance chokes are known in principle, they were not employed so far either in synchronous rectifiers or for resetting current transformers. The specific provision of the transconductance choke in the circuitry of the secondary side of the current transformer permits the resetting operation to be accomplished in clearly less time so that the freewheeling phase can be chosen to be shorter. That offers the advantage of permitting the push-pull voltage transformer, on the whole, to be operated at higher frequency and/or in the sense of greater variability of the clock ratio. As the freewheeling phase becomes shorter, the clock ratio of the transformer can be adjusted more flexibly, in response to the energy to be transmitted. A shorter freewheeling phase also contributes to increasing the efficiency.

Preferred embodiments of the invention are indicated in the dependent claims.

SHORT DESCRIPTION OF THE DRAWINGS

The invention will be described further by way of a preferred embodiment with reference to the drawings, in which.

DETAILED DESCRIPTION OF PREFERRED EMBODIMENTS

Figure 9:
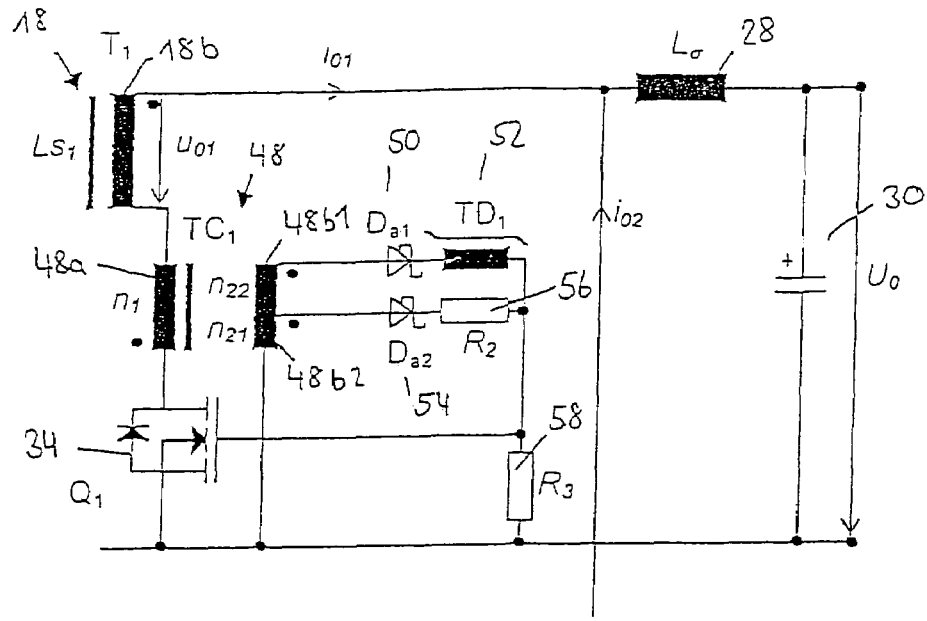
FIG. 9 is a schematic circuit diagram of the upper half of the secondary side of a synchronous rectifier circuit according to the invention, the lower half being mirror inverted.

FIG. 9 is a circuit diagram of the upper part of the secondary side of the synchronous rectifier according to the invention. The lower part of the secondary side is mirror inverted. The structure of the primary side may be of known design.

Figure 1:
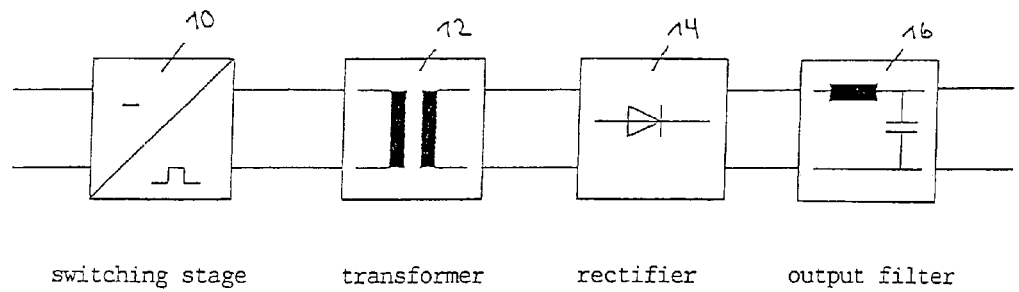
FIG. 1 is a block diagram of a push-pull voltage transformer circuit in which the invention may be used.
Figure 2:
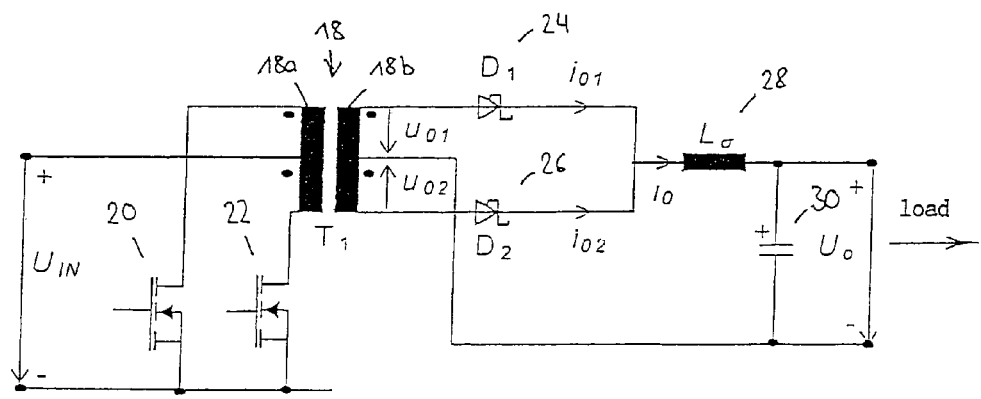
FIG. 2 is a schematic circuit diagram of a push-pull voltage transformer, including a diode-type rectifier.
Figure 3:
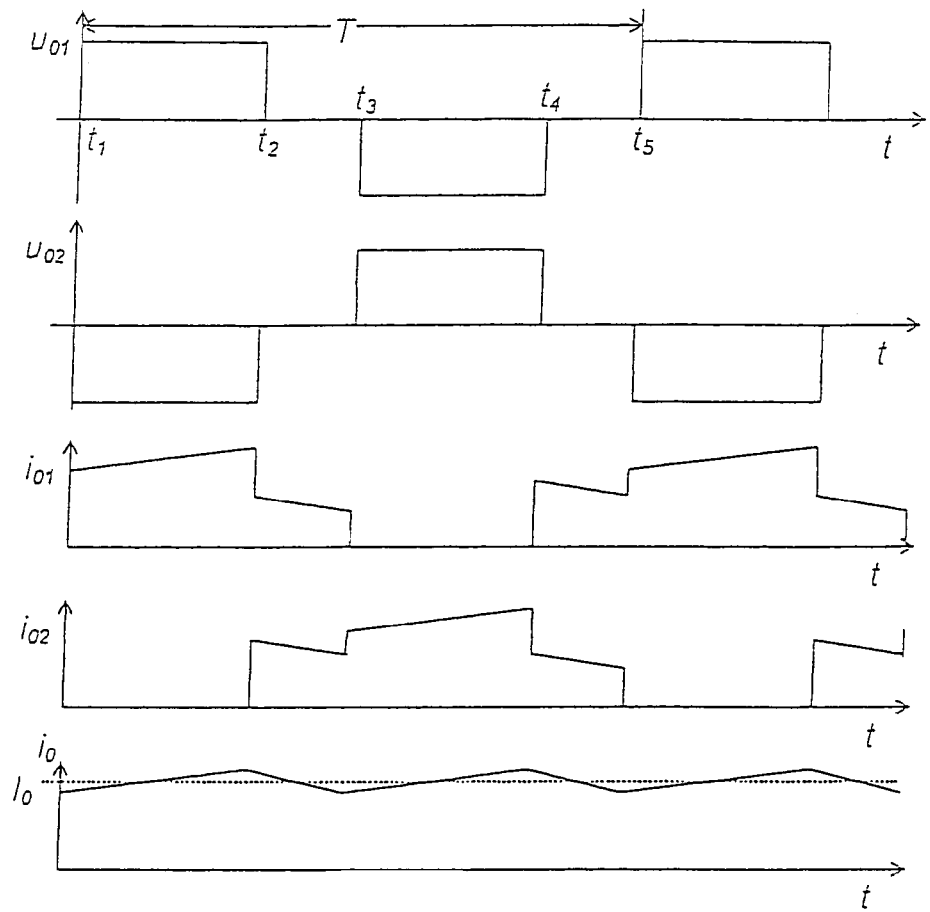
FIG. 3 shows idealized waveshapes of the output voltages and output currents of the push-pull voltage transformer shown in FIG. 2.
Figure 4:
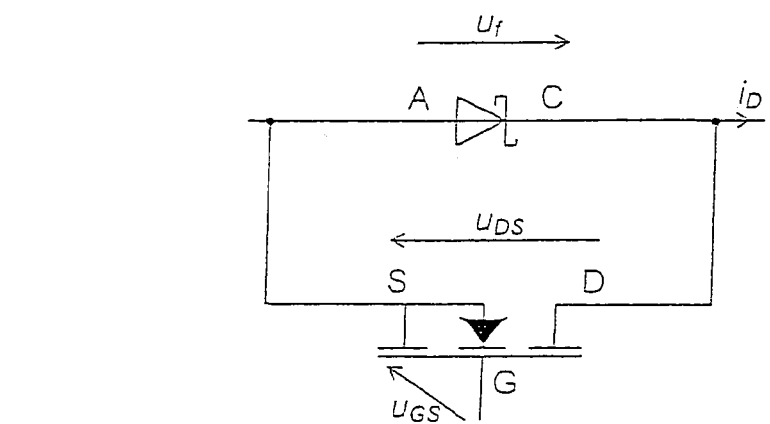
FIG. 4 is an equivalent circuit diagram of a MOSFET which may replace the diodes shown in FIG. 2.
Figure 5:
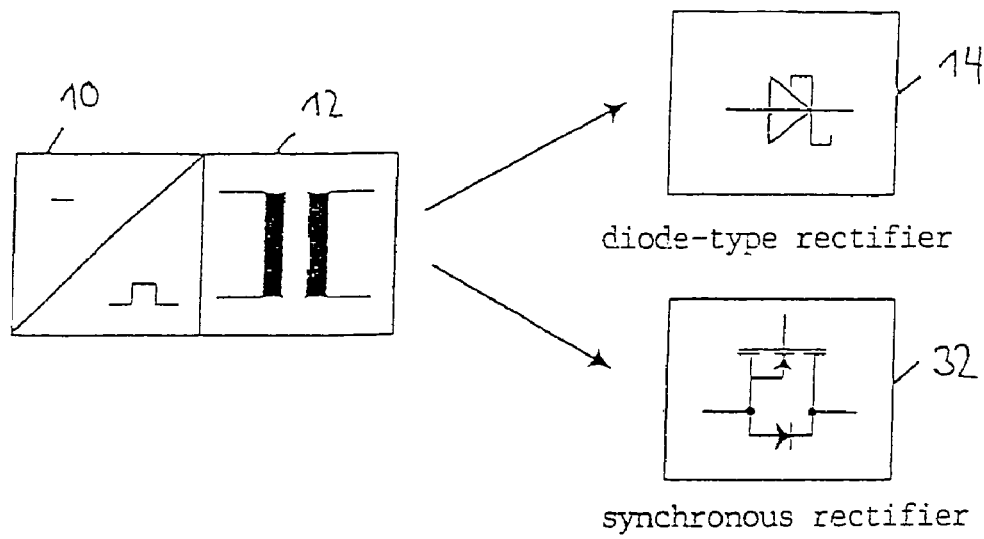
FIG. 5 illustrates the replacement of the diode-type rectifier of FIG. 1 by a synchronous rectifier including a MOSFET, in the form of a block diagram.
Figure 6:
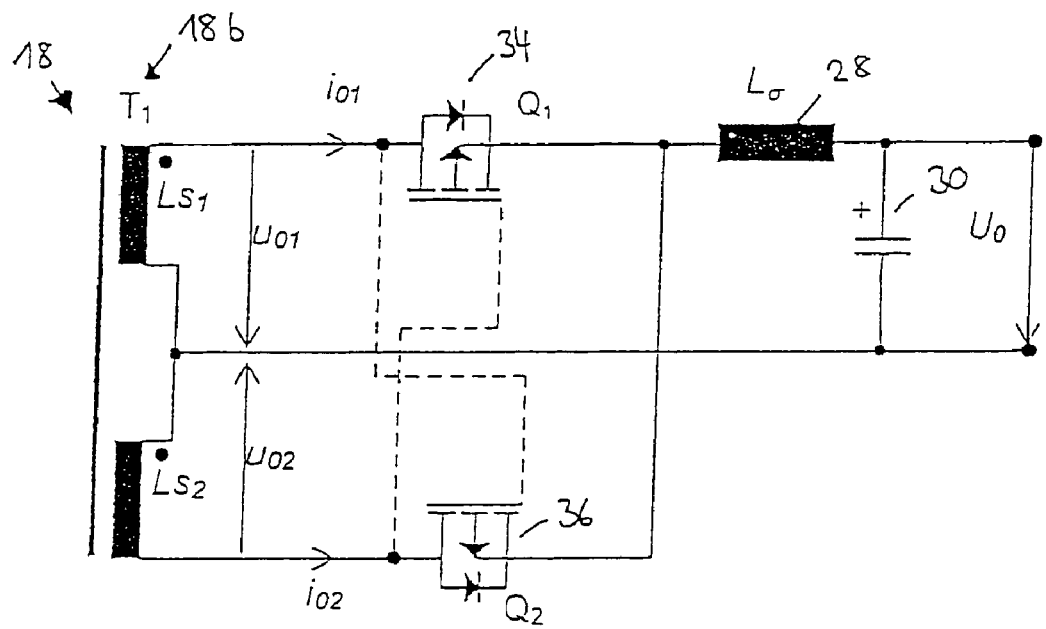
FIG. 6 is a schematic circuit diagram of the secondary side of a self-controlled synchronous rectifier.
Figure 7:
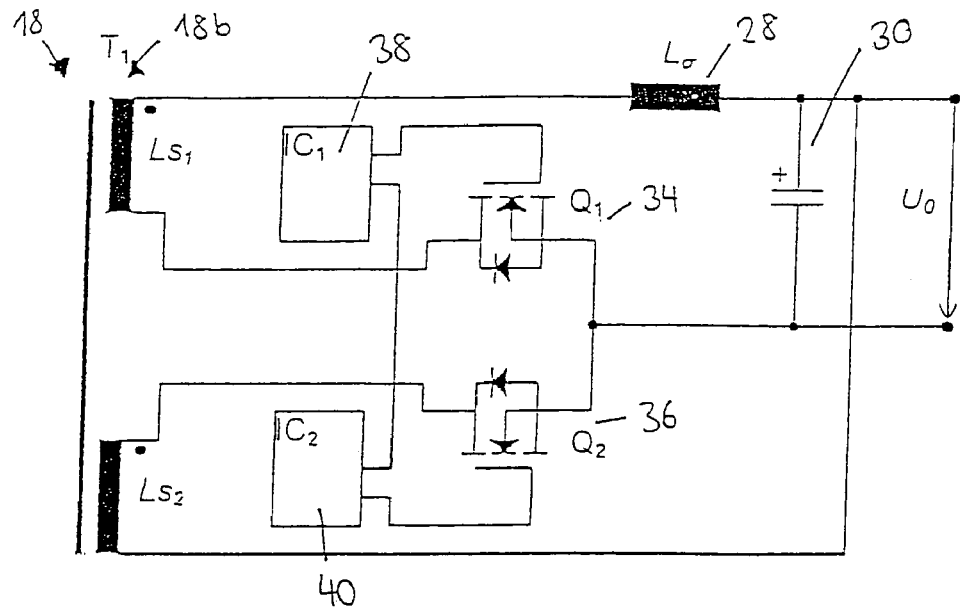
FIG. 7 is a schematic circuit diagram of the secondary side of an IC controlled synchronous rectifier.
Figure 8:
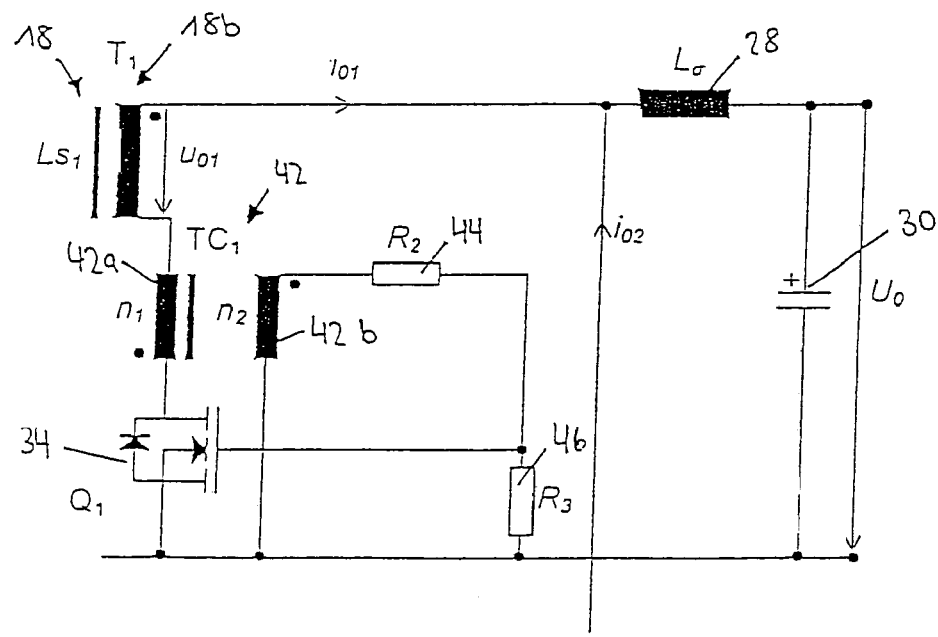
FIG. 8 is a schematic circuit diagram of the upper half of the secondary side of a synchronous rectifier including a current transformer, the lower half being mirror inverted.

Components corresponding to those in the circuitry shown in FIGS. 6 to 8 are designated by the same reference numerals.

At its secondary side, the synchronous rectifier circuit according to the invention comprises a first secondary winding section $L_{s1}$ of the power transformer 18 connected in series with a current converter transformer 48 and a MOSFET. The current converter transformer 48 comprises a primary winding 48a and a secondary winding 48b, the laffer being divided into two winding sections 48b1 and 48b2. The first secondary winding section 48b1 is connected to a first branch which, in the embodiment illustrated in FIG. 9, includes a diode 50 and a transconductance choke 52. The second secondary winding section 48b2 is connected to a second branch including a diode 54 and a resistor 56. The transconductance choke 52 is also known as "magnetic amplifier" or "mag amp".

The first and second branches are connected via another resistor 58 to a common reference potential of the synchronous rectifier circuit.

As is known and also shown in FIG. 8, a storage choke 28 and a storage capacitor 30 are provided to form an output filtering stage at the output of the synchronous rectifier circuit.

The function of the synchronous rectifier circuit, in principle, is based on the following switching behavior: To turn on the MOSFET 34, a relatively high current is generated across the second secondary winding section 48b2. At the same time, relatively low current flows through the first secondary winding section 48b1 and the first branch in which the transconductance choke 52 is located: .To that end, the winding ratio of the first and second winding sections 48b1, 48b2 to the primary winding 48a is suitably chosen. In particular, a low winding ratio n21/n1 in the order of magnitude of 10:1 of the second secondary winding section 48b2 to the primary winding 48a is chosen so that a high switch-on current will be generated and the MOSFET 34 be turned on very rapidly. A high winding ratio n22/n1 in the order of magnitude of 100:1 of the first secondary winding section 48b1 to the primary winding 48a together with the high inductivity of the transconductance choke then lead to slow current rise in the first branch. As the current increase, the inductivity of the transconductance choke 52 decreases—the transconductance choke 52 is "switched on"—and consequently the current across the resistor 56 becomes very small again.

This switching behavior is due to the property of the transconductance choke 52, namely having a high inductivity at low current and acting like an open switch. As the current increases, the inductivity decreases until the transconductance choke acts like a closed switch. This switching behavior is exploited advantageously by the invention.

In practice, the switch-off behavior of the circuit is somewhat more complicated than in the other circumstances described above. In a practical implementation, therefore, some additional components are necessary and advantageous in combination with a non-ideal transconductance choke, as will be described below.

Figure 10:
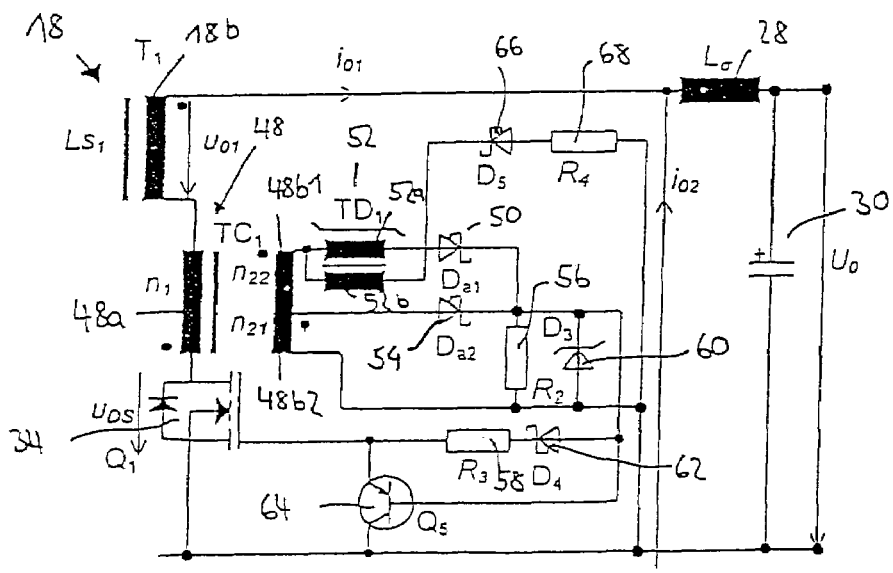
FIG. 10 is a schematic circuit diagram of the upper half of the secondary side of the synchronous rectifier circuit according to the invention, similar to the illustration in FIG. 9 but with further details, in a first operating phase.
Figure 11:
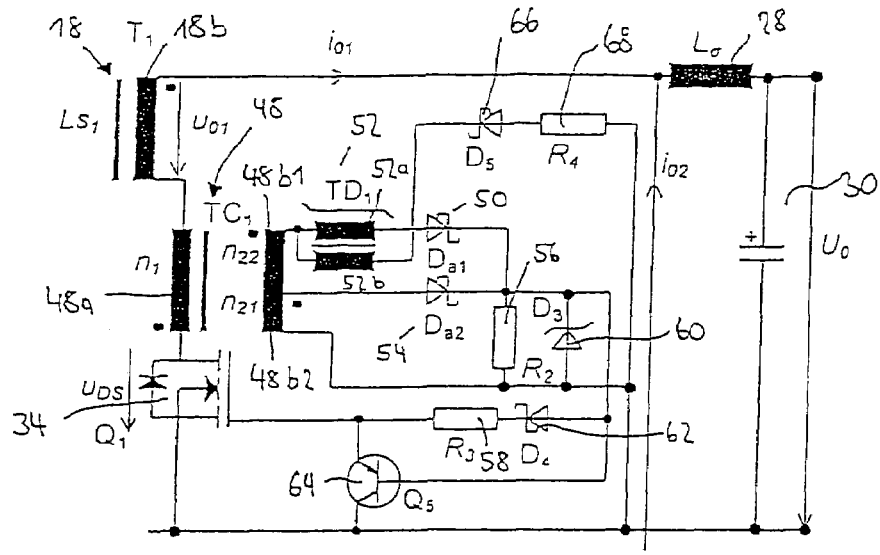
FIG. 11 shows a circuit diagram similar to FIG. 10, in a second operating phase.
Figure 12:
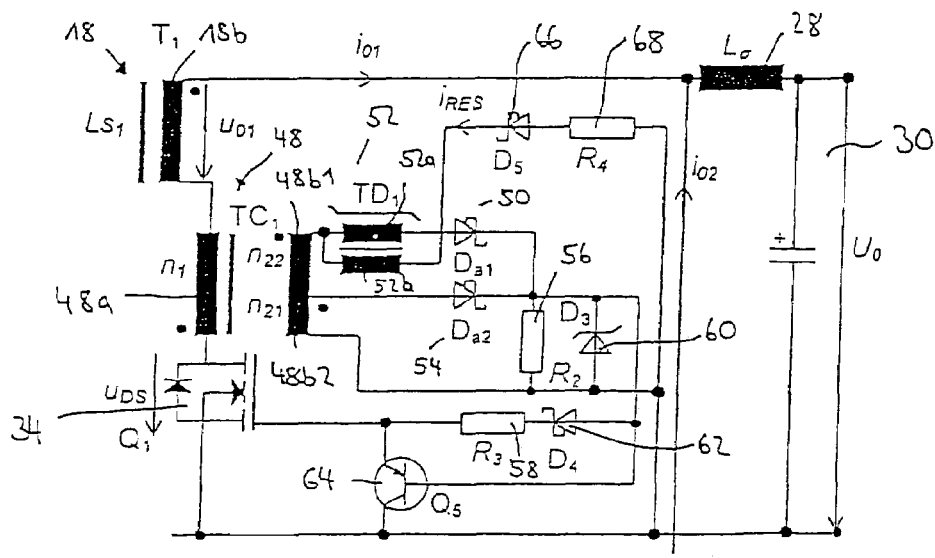
FIG. 12 shows a circuit diagram similar to FIGS. 10 and 11, in a third operating phase.

FIGS. 10 to 12 illustrate detailed circuit diagrams of the synchronous rectifier circuit according to the invention. The main constituent parts of the secondary rectifier continue to be the current transformer 48 and the MOSFET 34, the current transformer 48 comprising a first output branch which includes the transconductance choke 52 and the diode 50, and a second output branch which includes the diode 54 and the resistor 56. In addition to the circuit of FIG. 9, FIGS. 10 to 12 show a diode 60 which is connected parallel to the resistor 56 and another diode 62 connected in series to the resistor 58. The first and second branches connect the secondary winding 48b of the current transformer 48 through the diode 62 and resistor 58 and, furthermore, through a transistor 64 connected in parallel with them, especially a bipolar pnp-transistor, to the gate of the MOSFET 34.

FIGS. 10 to 12 further show the transconductance choke 52 having a first winding 52a in the first branch and a second winding 52b connected in series to a diode 66 and a resistor 68, this series connection being connected in parallel with the first and second branches, as may be seen in FIGS. 10 to 12.

Operation of the synchronous rectifier circuit according to FIGS. 10 to 12 will be described in greater detail below, with reference to the waveshapes illustrated in FIG. 13. The idealized waveshapes of FIG. 13 demonstrate the output voltage $u_{01}$ of the upper winding section $L_{S1}$, of the secondary side 18b of the power transformer 18, furthermore the output current $i_{01}$, of this winding section $L_{S1}$, and the drain-source voltage $u_{DS}$ of the MOSFET 34, as well as the reset current $i_{RES}$ (see FIG. 12) to reset the current converter transformer 48 and the transconductance choke 52.

Figure 13:
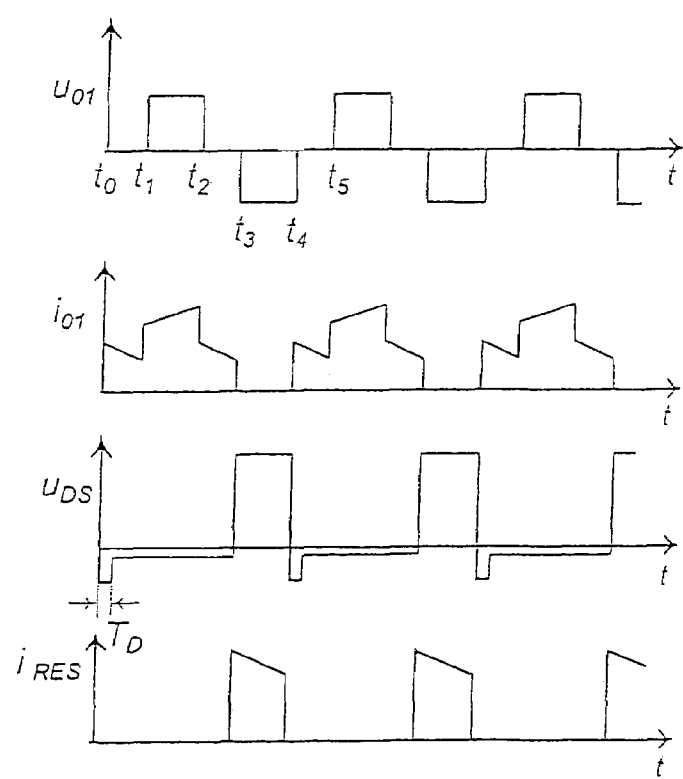
FIG. 13 shows idealized waveshapes of the output voltages and output currents of the synchronous rectifier circuit according to FIGS. 10 to 12.

The output voltage $u_{01}$ is zero during the time interval from $t_0$ to $t_1$ (see FIG. 13). During this phase, which corresponds to the freewheeling phase, both MOSFET switches 34, 36 are conducting (not shown in the figs but mirror inverted to the presentation in FIGS. 10 to 12).

At time $t_0$ current $i_{01}$, flows through the inverse diode of MOSFET 34 (FIG. 10) and the current transformer 48. Accordingly, current also flows through the diode 54 and begins to charge the input capacitance of the MOSFET 34. This current depends in the first place on the winding ratio n21/n1 of the second secondary winding section 48b2 to the primary winding 48a of the current converter transformer 48 and on the load.

A negligibly small current also flows through the transconductance choke 52 during the first time interval TD (see FIG. 13). The winding ratio n22/n1 of the second secondary winding section 48b2 to the primary winding 48a of the current converter transformer 48, the transconductance choke 52 itself and the load all influence the switching behavior of the MOSFET 34 (see FIG. 11). The winding ratio n22/n1 must be chosen depending on the transconductance choke 52 such that drive losses will be minimized. At the end of the time interval TD the transconductance choke 52 is saturated and the MOSFET 34 fully turned on (see FIG. 13).

The diode 69 and the resistor 56 determine the level of the gate-source voltage of the MOSFET 34. The resistor 58 serves to attenuate oscillations in the gate circuit.

At time $t_1$, the MOSFET 34 continues to be conducting, while the other MOSFET 36 (not illustrated in the figs.) turns off. Consequently, all the output current flows through MOSFET 34.

During the freewheeling phase, time interval $t_2$ to $t_3$, the behavior of the circuit corresponds to what has been described above. Beginning at time $t_3$, the voltage $u_{01}$ across the secondary winding section $L_{S1}$, becomes negative. Thereupon, the current through the MOSFET 34 decreases. As a consequence, the voltages across the secondary winding sections 48$b$1 and 48$b$2 of the current converter transformer 48 are inverted, the transistor 64 becomes conducting and, thereby, accelerates turning off of the MOSFET 34.

The negative voltages at the secondary winding sections 48$b$1, 48$b$2 of the current transformer 48 start the resetting process of the transconductance choke 52. A reset current $i_{RES}$ flows through the resistor. 68 and the diode 66, resetting the current transformer 48 and the transconductance choke 52 (see FIG. 12).

The reset current is limited by the resistor 68. The diode 66 makes sure that current will flow during this interval alone. Reset current $i_{RES}$ stops to flow no later than at time 4 when the freewheeling phase begins.

If both MOSFETs 34, 36 should be non-conducting when the synchronous rectifier is switched on the respective inverse diodes take care of the flow of current when it begins to flow through the secondary winding 18$b$ of the power transformer 18. At the same time, current also flows through the primary winding 48$a$ of the current converter transformer 48 and thus through the first and second secondary winding sections 48$b$1, 48$b$2. The transconductance choke 52 prevents current from flowing through the first branch, but current serving to charge the gate capacitances of the MOSFETs 34, 36 does flow through the diode 54 of the second branch. The small transmission ratio in the order of 10:1 of the second secondary winding section 48$b$2 to the primary winding 48$a$ of the current converter transformer 48 brings about a relatively great switching current and results in extreme acceleration of the driving of MOSFETs 34, 36. This quick charging in turn cuts the time of current flow across the inverse diodes. The MOSFET 34, 36 becomes conducting as the threshold voltage is reached. In this context, the resistors 56, 58 serve as current limiters and the diode 60 as a voltage limiter. The transistor 24 is blocked at this time. As already described, also the transconductance choke 52 is blocked during this first switch-on phase. The transconductance choke 52 acts as a magnetic switch in this circuit. It is only after a certain charging time that the transconductance choke 52 becomes saturated, which corresponds to a closed switch condition, so that the gate capacitance of the MOSFET 34, 36 is fully charged through the diode 50 and thus the synchronous rectifier is fully controlled.

The selection of a greater transmission ratio in the order of 1:100 between the primary winding 48$a$ and the first secondary winding section 48$b$1 of the current converter transformer 48 brings with it a smaller charging current and, therefore, less driving losses of the synchronous rectifier.

As already mentioned, it is an advantageous feature of the invention that the transconductance choke 52 and the current converter transformer 48 can be reset or demagnetized quickly and easily after a switching operation. To this end, the transconductance choke 52 is provided with a second winding 52$b$, as may be seen in FIGS. 10 to 12, which may have four turns, for example. The winding direction, here, is opposed to that of the first winding 52$a$ of the transconductance choke 52. The second winding 52$b$ is fed through both the resistor 68, serving as current limiter, and the diode 66 preventing current to flow in the opposite direction. The reset operations of the transconductance choke 52 and the current converter transformer 48 each take place during the blocking phase of the MOSFETs 34, 36. During this time period the voltage at the corresponding winding section of the secondary side 18$b$ of the power transformer 18 is negative. Due to this negative potential, current will flow through the resistor 68, diode 66, transconductance choke 52 and secondary winding 48$b$ of the current converter transformer 48. The voltage at the secondary side of the current transformer jumps to negative potential, and the subsequent falling current flow magnetizes the current transformer and the transconductance choke in opposite direction. The return current $i_{RES}$ breaks off (see FIG. 13) as the voltage at the secondary side, e.g. $L_{S1}$, of the power transformer 18 returns to 0 volt (freewheeling phase). Thereafter, both inductivities, of the transconductance choke 51 as well as the current converter transformer 48, are demagnetized and ready for the next switching operation.

The guidelines below may be followed for selecting and dimensioning the various components of the synchronous rectifier circuit according to the invention.

The power transformers, MOSFETs, in the first place are selected with a view to a low forward resistance, preferably a forward resistance $R_{DS}$<50 m$\Omega$, a drain-source voltage and a drain-source current depending on the desired output voltage and output current.

The optimum transmission ratio of the current converter transformer should be determined experimentally, depending on the particular case of application. Winding ratios of the primary winding 48$a$ to the first secondary winding section 48$b$1 to the second secondary winding section 48$b$2 of 1:50:5 and 1:100:10 have provided good test results in this configuration.

In the rectifier circuit, the transconductance choke 52 assumes the function of a switch. It is responsible for a second stage of driving the MOSFET to take place after a certain time TD, as described above.

A transconductance choke essentially consists of a saturable annular soft magnetic core including one or more windings. The hysteresis curve of the core is almost rectangular. The magnetic switch is either on or off, depending on the degree of magnetization of the choke. The behavior of the transconductance choke will be described briefly. When voltage is applied to the choke the inductivity of the choke, initially, is very high, and no current flows through the choke. After the lapse of a period of time TD, the choke enters into a state of saturation, and then its inductivity is very small. At this state, current flows through the winding of the transconductance choke, the magnetic switch is closed. The magnetic flux density remains almost constant as long as this current flows. When the flow of current through the choke is interrupted the magnetic field strength .decreases while the magnetic flux density continues to remain constant. If a current now flows in the opposite direction (reset current) or if a negative voltage is applied the inductivity of the choke goes down towards zero so that the transconductance choke will become demagnetized. If the reset current flows for a long enough time the transconductance choke will end up being fully demagnetized and thus be reset. In case the reset current continues to flow the transconductance choke will become magnetized in the opposite direction, and the magnetic switch is opened again.

The function of further individual components is as follows:

The diodes 50, 54, and 58 prevent reset current from flowing during the blocking phase of the MOSFETs 34, 36. Schottky diodes, for example, may be selected since their loss is rather small due to their small forward voltage and as they allow relative great currents to be applied.

The resistor 56 and the Zener diode 60 serve for adjusting the gate-source voltage. The resistor 58 serves as a gate resistor to suppress oscillations. Furthermore, the provision of the resistor 58 upstream of the transistor 64 abbreviates switching-off of-the MOSFET 34, whereby the efficiency of the overall circuit is improved once more. The transistor 64 serves for discharging the gate capacitance of the MOSFETs 34. 36. The resistor 68 and the diode 66 serve for demagnetizing the transconductance choke 52 and the current transformer 48.

The features disclosed in the specification above, in the claims and drawings may be significant for implementing the invention in its various embodiments, both individually and in any combination.

The invention provides a synchronous rectifier for use in a push-pull voltage transformer, being exceptionally efficient and quick in switching. This makes it possible, on the one hand, to apply the circuit according to the invention particularly also in multi-stage switch mode power supply and, at the same time, to obtain switch mode power supply operating at high frequency and/or being flexible as regards the clock ratio. The invention is particularly advantageous for switch mode power supply with low output voltage, such as <24 V, where the losses of a diode-type rectifier are especially significant. Examples of applications are switch mode power supply for telecommunications systems, computers and industrial applications, as well as voltage supply for processor cores, and particularly all those applications which require low voltages and high currents.

LIST OF REFERENCE NUMERALS

10 input switching stage
12 power transformer
14 rectifier circuit
16 output filter
18 power transformer
18*a* primary side of the power transformer
18*b* secondary side of the power transformer
20 power transistor
22 power transistor
24 secondary diode
26 secondary diode
28 storage choke
30 storage capacitor
32 synchronous rectifier circuit
34 MOSFET, electronic switch
36 MOSFET, electronic switch
38 driver IC
40 driver IC
42 current transformer
42*a* primary winding of the current transformer
42*b* secondary winding of the current transformer
44 resistor
46 resistor
48 current converter transformer
48*a* primary winding of current converter transformer
48*b* secondary winding of current converter transformer
48*b*1 first secondary winding section
48*b*2 second secondary winding section
50 diode
52 transconductance choke
52*a* first winding of the transconductance choke
52*b* second winding of the transconductance choke
54 diode
56 resistor
58 resistor
60 diode
62 diode
64 transistor
66 diode
68 resistor

What is claimed is:

1. A synchronous rectifier circuit, comprising:
    a power transformer (12; 18) having a primary side (18*a*) including a first and a second primary winding sections and a secondary side (18*b*) including a first and a second secondary winding sections,
    a rectifier circuit (32) at the secondary side of the power transformer (12; 18), which rectifier circuit having a first and a second electronic switches (34, 36) associated with the first and the second secondary winding sections (18*b*), respectively,
    a first and a second current transforming means (48) associated with the first and the second secondary winding sections, respectively, and a first and a second drive circuits (50, 58) for the first and second electronic switches (34, 36), respectively,
    each current transforming means (48) generating first and second currents dependent on the current of the secondary winding section (18*b*) and each drive circuit (50, 58) comprising a first branch (50, 52) and a second branch (54, 56) to receive the first and second currents, respectively, generated by the current transforming device (48), and the first branch comprising a transconductance choke (52).

2. The synchronous rectifier circuit as claimed in claim 1, wherein each current transforming means comprises a converter-type current transformer (48) including a primary winding (48*a*) and first and second secondary windings (48*b*), the first and second branches of the drive circuit being associated with the first and second secondary windings, respectively, of the converter-type current transformer (48).

3. The synchronous rectifier circuit as claimed in claim 1, wherein the electronic switches (34, 36) each comprise a MOSFET.

4. The synchronous rectifier circuit as claimed in claim 2, wherein the primary winding is connected in series to the first secondary winding section (18*b*) of the power transformer (18).

5. The synchronous rectifier circuit as claimed in claim 3, wherein the first switch (34) is connected in series to the first secondary winding section (LS1) and the second switch (36) is connected in series to the second secondary winding section (LS2).

6. The synchronous rectifier circuit as claimed in claim 3, wherein the first branch connects the first secondary winding (48*b*1) via a diode (50) and a transconductance choke (52) to a first gate of the associated MOSFET (34).

7. The synchronous rectifier circuit as claimed in claim 10, wherein the switch winding (52*a*) is disposed in the first branch and the reset winding (52*b*) is disposed in a reset branch.

8. The synchronous rectifier circuit as claimed in claim 2, wherein the first secondary winding (48*b*1) has a greater number of windings than the second secondary winding (48*b*2) of the converter-type current transformer (48).

9. The synchronous rectifier circuit as claimed in claim 8, wherein the winding ratio (n1:n22:n21) of the primary winding (48a) to the first secondary winding (48b1) to the second secondary winding (48b2) of the converter-type current transformer (48) is in the order of 1:100:10.

10. The synchronous rectifier circuit as claimed in claim 1, wherein the transconductance choke (52) comprises a switch winding (52a) and a reset winding (52b).

11. The synchronous rectifier circuit as claimed in claim 10, wherein the winding ratio of the switch winding (52a) to the reset winding (52b) is in the range of 1:4.

12. The synchronous rectifier circuit as claimed in claim 11, wherein the reset branch further comprises a second diode (66).

13. The synchronous rectifier circuit as claimed in claim 1, further comprising an input switching stage (10) coupled to the power transformer (18).

14. The synchronous rectifier circuit as claimed in claim 1, further comprising an output filter stage (16) coupled to the rectifier circuit (32).

15. A push-pull transformer comprising a synchronous rectifier circuit as claimed in claim 1.

16. The synchronous rectifier circuit as claimed in claim 1, wherein the primary winding of the second current transforming means is connected in series to the second secondary winding section of the power transformer (18).

17. The synchronous rectifier circuit as claimed in claim 3, wherein the second branch connects the second secondary winding (48b2) of the converter-type current transformer (48) via a diode (56) to a second gate of the associated MOSFET (34).

18. The synchronous rectifier circuit as claimed in claim 6, wherein a switching element (64) is interposed between a gate of the MOSFET (34) and at least one of the first or the second branches.

19. The synchronous rectifier circuit as claimed in claim 18, wherein the switching element (64) includes a bipolar transistor.

20. The synchronous rectifier circuit as claimed in claim 10, wherein the first branch and the second branch are in parallel.

21. A power transformer (12) comprising a primary side (18a) and a secondary side (18b) for providing a current output($i_0$);

the secondary side (18b) having a current transformer (48) for controlling the output voltage of the power transformer, the current transformer (48) including a first winding ($n_1$) in electromagnetic communication with a bifurcated second winding ($n_{22}$, $n_{21}$); wherein the ratio of the first current winding ($n_1$) to the bifurcated second current winding ($n_{22}$, $n_{21}$) is adapted to maintain a substantially constant current output ($i_0$).

22. The transformer of claim 21, wherein the current transformer 48 is coupled to a transconductance choke (52).

23. The transformer of claim 21, wherein a ratio of the first current winding to the second current winding $n_1$:$n_{21}$:$n_{21}$ is in the range of 1:50:5 to 1:100:10.

24. The transformer of claim 22, further comprising a first and a second drive circuit for driving the transconductance choke.

* * * * *